No. 884,627. PATENTED APR. 14, 1908.
F. H. TREVELLIAN.
CASH REGISTER.
APPLICATION FILED DEC. 29, 1906.
4 SHEETS—SHEET 1.
FIG. 1.
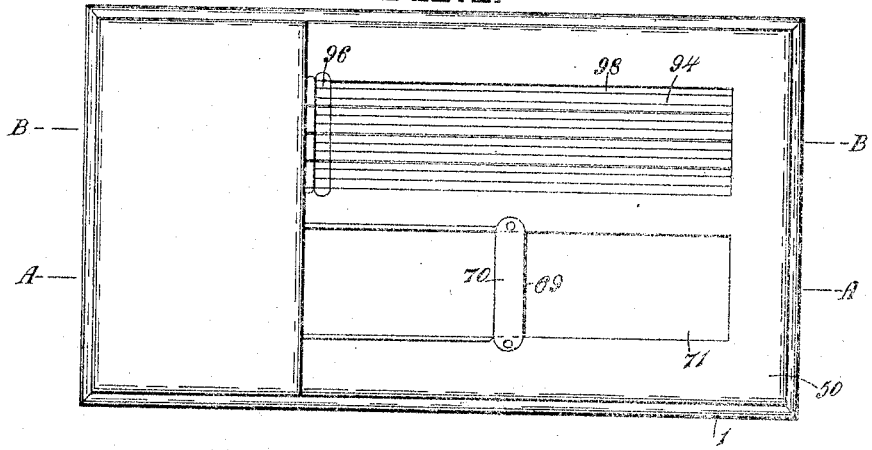
FIG. 2.
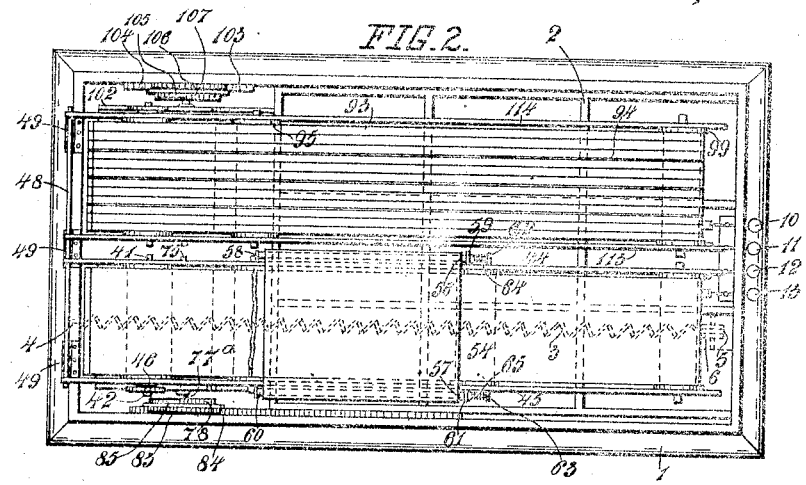
FIG. 3.
Witnesses.
Sydney Higgs
Otto Milton
Inventor.
Frederic Henry Trevellian.
By Baldwin & Rayward
Attorneys.

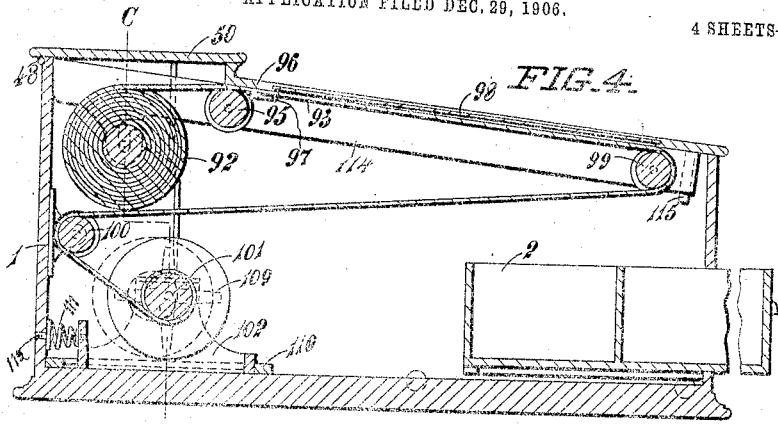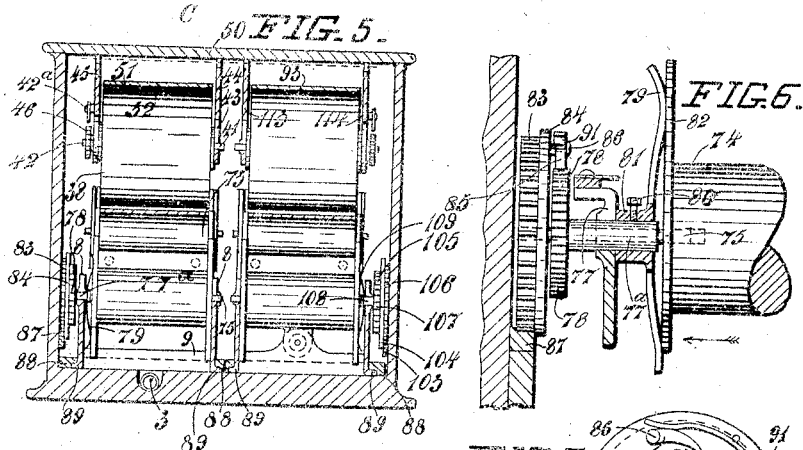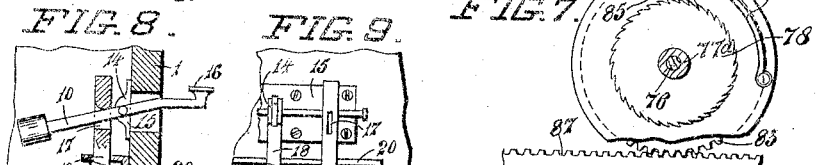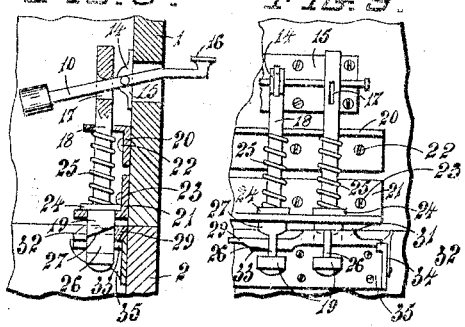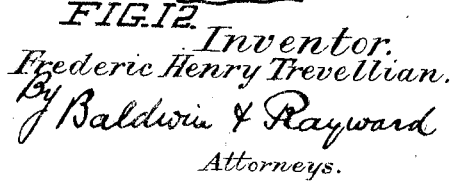

No. 884,627.

F. H. TREVELLIAN.
CASH REGISTER.
APPLICATION FILED DEC. 29, 1906.

PATENTED APR. 14, 1908.

4 SHEETS—SHEET 3.

Witnesses.
Sydney H. Bigg.
Percy B. Wright.

Inventor.
Frederic Henry Trevellian.
By Baldwin & Rayward
Attorneys.

No. 884,627. PATENTED APR. 14, 1908.
F. H. TREVELLIAN.
CASH REGISTER.
APPLICATION FILED DEC. 29, 1906.

4 SHEETS—SHEET 4.

Witnesses.
Sydney H. Higgs
Oths. V. Milton

Inventor.
Frederic Henry Trevellian.
By Baldwin & Rayward
Attorneys.

UNITED STATES PATENT OFFICE.

FREDERIC HENRY TREVELLIAN, OF WELLINGTON, NEW ZEALAND.

CASH-REGISTER.

No. 884,627.

Specification of Letters Patent.

Patented April 14, 1908.

Application filed December 29, 1906. Serial No. 350,063.

*To all whom it may concern:*

Be it known that I, FREDERIC HENRY TREVELLIAN, a subject of His Majesty the King of Great Britain and Ireland, residing at National Chambers, Grey street, Wellington, in the Provincial District of Wellington, in the Colony of New Zealand, have invented certain new and useful Improvements in Cash-Registers, of which the following is a specification.

This invention relates to the class of apparatus known as cash registers wherein a sliding till or drawer divided into compartments is used for containing coins and the like.

The object of my invention is to provide apparatus whereon a salesman can make out an invoice or docket, and record a duplicate copy thereof upon a continuous strip of paper, which copy cannot be tampered with and is withdrawn into the apparatus beyond the reach of the salesman by the action of opening the till drawer. The total of each invoice is entered by the salesman upon a separate strip of paper which is withdrawn into the apparatus simultaneously with the strip containing the copy of the invoice but to a distance sufficient only to withdraw one row of figures.

Figure 8A:
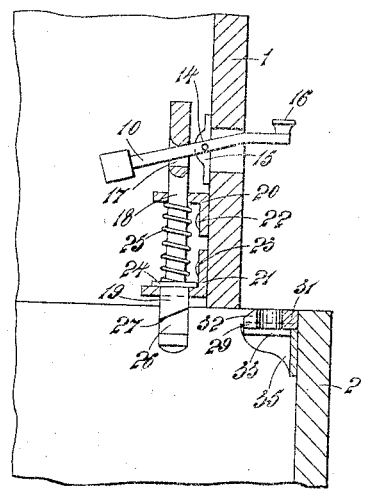
Figures 14, 15:
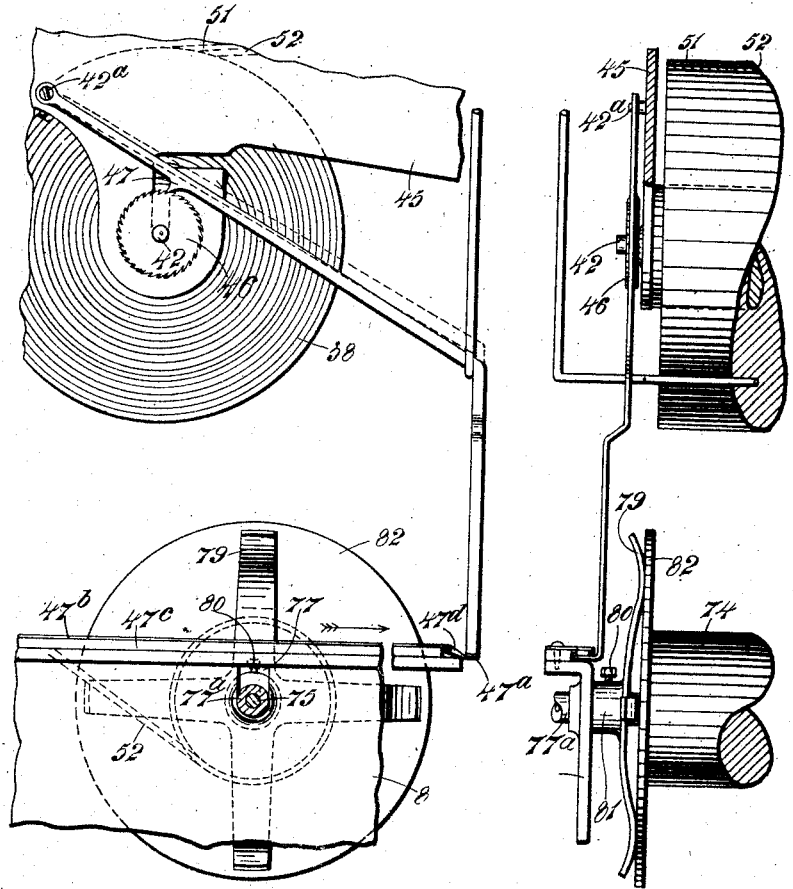
Figures 16, 17:
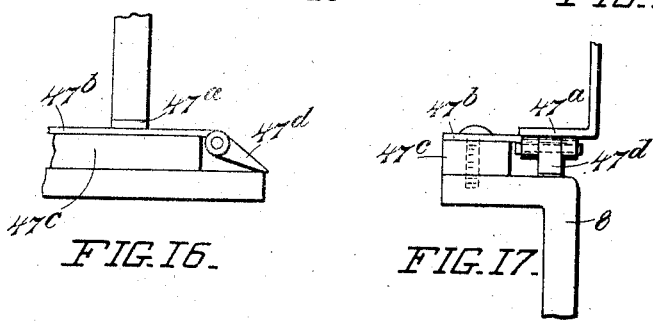

The drawings herewith illustrate the invention,—Figure 1 is a plan, Fig. 2 a plan with the top of the apparatus removed and partly in section. Fig. 3 is a sectional elevation on line A—A Fig. 1. Fig. 4 is a sectional elevation on line B—B, Fig. 1, and Fig. 5 a cross section on line C—C, Fig. 4 of the apparatus. Fig. 6 is a sectional elevation, and Fig. 7 an end elevation of clutch mechanism, Fig. 8 is a sectional elevation, and Fig. 8$^a$ is a sectional elevation of the locking mechanism just prior to shutting the drawer. Fig. 9 a front view of part of a lock. Fig. 10 is a plan of part of a locking plate, Fig. 11 a perspective view of part of a locking plate bracket and catch. Fig. 12 a perspective view of the underneath of part of the locking plate. Fig. 13 an elevation of a spring catch, Fig. 14 a side elevation and Fig. 15 an end elevation on a larger scale of releasing mechanism, Fig. 16 is a side elevation, and Fig. 17 an end elevation of a pawl and attachments.

The invention comprises a casing 1 adapted to receive the till drawer 2 which is actuated by a spring 3 secured at one end by a screw 4 to the back of the casing. The other end of the spring is attached to a cord 5 which, passing around a grooved pulley 6 near the front of the casing, is secured at its other end to a bar 7 riveted to cheeks 8 of a carriage 9.

The drawer is held in its closed position by a lock shown on a large scale in Figs. 8 to 12 consisting of a plurality of weighted keys 10, 11, 12 and 13 pivoted in jaws 14 of a bracket 15 secured upon the inside of the front of the casing 1. The outer ends of the keys are provided with key pieces 16 and the inner ends of the keys pass through slots 17 in the stems 18 of the bolts 19. Brackets 20 and 21 secured to the inside of the casing by screws 22 and 23 have holes adapted to receive the stems 18 and the bolts 19 respectively which have collars 24 normally resting upon the bracket 21 under pressure of springs 25 located upon the stems 18 and in compression between the bracket 20 and the collars 24. The bolts are formed with necks 26 of thin section and with sloping faces 27.

The bolts engage in holes 28 of a plate 29 secured upon the inside of the front of the drawer 2 and the said plates have slots 30 extending through their edges to the holes 28 and sufficiently wide to admit the necks 26 of the bolts freely. The plate 29 has upper bosses 31 with sloping faces 32 adapted to slide upon the sloping faces 27 and lift the bolts 19. The plate also has lower bosses 33.

Upon closing the drawer the sloping faces 32 of the plate 29 pass underneath the sloping faces 27 formed upon the circular part of the bolts 19 which are thus raised against the resistance of the springs 25, until the said bolts fall into the holes 28 of the upper bosses 31 and thus lock the drawer. By pressing down the key 10 (Fig. 8) the circular part of the bolt 19 is raised until it is free from its hole 28 thus no longer preventing the drawer from being opened. If, however, a key passing through a lower boss 33 (as shown in Fig. 9) is also raised by depressing another key, then the lower circular part of such bolt will enter the boss 33 and prevent the opening of the drawer. Thus in order to unlock a drawer it is necessary to depress keys which pass through upper bosses only, and leave the other keys undisturbed, and only persons acquainted with the combination can operate the keys necessary for so unlocking the drawer.

A number of plates 29 are provided with each apparatus, the bosses 31 and 33 being provided around different holes 28 as required to vary the combinations of the keys.

Thus when it is desired to substitute a combination which has been in use for a time by another combination, it is necessary merely to change the plate 29 for another plate with the bosses 31 and 33 arranged around holes different from the holes in the substituted plate.

In order that the plate 29 may be readily removed and another plate placed in position I prefer to secure the plate by means of spring catches 34 located in a bracket 35 fixed to the front of the drawer 2. The brackets are provided with recesses 36 adapted to receive lugs 37 integral with the plate 29 and having recesses wherein the spring catches 34 engage. A plate is inserted by pressing it into position and thereby pushing the catches 34 laterally and a plate is readily removed by pushing aside the said catches and then lifting the plate.

Referring now to the apparatus shown more particularly in Figs. 1, 2—3 and 5 for operating the paper whereon invoices are written the drum 38 contains a roll of duplicate bands of paper 51 and 52. The drum is mounted revolubly between the frames 44 and 45 upon pins 41 and 42. The pin 41 is fixed to the drum and revolves in a slot 43. The pin 42 is fixed to the drum and revolves in a slot formed in the frame 45 and is provided with a ratchet wheel 46. A pawl 47 (see Figs. 14 to 17) pivoted upon a pin 42$^a$ to the frame 45 extends downwardly and has an integral foot 47$^a$ at right angles to the said extensions. The frame 8 is provided with a bar 47$^b$ supported upon a distance piece 47$^c$ and which it overhangs, whereby the foot 47$^a$ may pass below the said bar 47$^b$ see Figs. 14 and 16. A pawl or dropper 47$^d$ is pivoted upon the end of the bar 47$^b$ and slides beneath and raises the foot 47$^a$ and the pawl 47 immediately the carriage 9 moves in the direction of the arrow shown in Fig. 14. When the drawer is open the foot 47$^a$ falls over the end of the bar 47$^b$ and upon the closing of the drawer the foot 47$^a$ passes beneath the barb 47$^b$ and the pawl 47$^d$ leaving the said pawl 47 engaged with the ratchet wheel and preventing the drum 38 from revolving. The frames 44 and 45 are hinged upon a pin 48 passing through hinges 49 whereby the top 50 of the casing is hinged to the back of the casing 1. The bands of paper 51 and 52 are led from the drum 38 over a roller 53. The upper band 51 passes over a band 54 of carbon paper or other carbon prepared material and the band 52 passes below the said carbon prepared paper. In this position the upper paper is exposed through an aperture in the top of the casing so that the operator may write thereon. A plate 55 secured to the frames supports the several papers while the upper band 51 is written upon and so that a carbon copy will be made of the writing upon the band 52.

The band 54 of carbon paper or material is mounted upon rollers 56 and 57 whereupon a supply of carbon paper or material is stored for the purpose of renewing the carbon paper or material as it becomes deteriorated through use. The rollers are mounted in bearings, 58, 59—60, 61 secured to the frames 44 and 45 and have milled heads 62 and 63 whereby they are readily operated. The friction of the springs 64 and 65 located on the rollers and in compression between the heads 62 and 63 and the bearings 59 and 61 prevents the rollers revolving when not required. The bands of paper 51 and 52 pass from the carbon prepared paper or material to rollers 66 and 67 between which they pass, and the upper band 51 is led through a slot 68 provided in the top of the casing and beneath the cutting edge 69 of a hood 70 fixed to the casing and covering the said roller 66. The lower band 52 is continued below a sheet of glass 71 let into the top of the casing and through which a copy of the invoice is visible. After passing around the roller 72, the band 52 is passed around a roller 73 near the back of the casing. The end of the band 52 is secured by means of any adhesive substance to a roller 74 which is revolubly mounted in the carriage 9 upon pins 75 and 76. The pin 76 is secured to the roller and revolves in a slot 77 formed in a cheek 8 of the carriage 9. The roller revolves upon the pin 75 which passes through a sleeve 77$^a$ integral with a ratchet wheel 78. A four armed friction spring 79 is fixed to the sleeve 77$^a$ by a screw 80 which passes through the boss 81 of the spring. The spring presses upon the flange 82 of the roller 74 and its boss bears against the cheek 8 of the carriage 9. A toothed wheel 83 is fixed upon the outer end of the pin 75 and has an integral disk 84 carrying a spring operated pawl 85 upon a pin 86. The wheel 83 meshes with a rack 87 secured to the side of the casing.

The operation of the apparatus is as follows:— After the operator has written his invoice upon the band 51 he releases the drawer by depressing the keys 10 and 12 or other combination of keys as arranged. The spring 3 pulls the carriage 9 outwards along the bottom of the casing guided by rabbeted battens 88 which fit over flanges 89 formed upon the cheeks of the carriage. The travel of the carriage is arrested by a stop 90 secured to the bottom of the casing. The carriage pushes the drawer 2 outwards, the continued travel of the drawer being effected by the operator pulling the drawer out to the full extent of its travel. During the outward travel of the carriage, the ratchet wheel 78 and the roller 74 are not revolved, owing to friction of the spring 79 against the flange 82 and the boss 81 against the cheek 8, the pawl 85 raising its spring 91 and riding idly over the teeth of the ratchet wheel the disk 84 being revolved by the wheel 83 as the wheel travels along the rack 87 and the pawl 47 being raised as previously described to release the drum 38. A length of paper equal to the travel of the carriage 9 is thus unrolled from the drum 38. Upon closing the drawer the carriage is pushed to the back of the casing and the wheel 83 being revolved as it passes along the rack 87 and the pawl 85 engaging the teeth of the ratchet wheel 78 the roller is revolved by the friction of the spring 79 to roll up the length of the paper band 52 drawn out by the opening of the drawer. The end of the upper band 51 bearing the written invoice passes through the slot 68 and is torn off by the operator by means of the cutting edge 69 against which he pulls the paper, while tearing the same. The carbon copy of the invoice upon the band 52 is drawn below the sheets of glass 71 wherethrough it may be read. After placing the cash in the till drawer 2 the operator closes the drawer and the invoices are thus coiled in a roll around the roller 74 from which they are detached as required.

Referring now more particularly to Fig. 4 and to the mechanism for operating the band whereon totals of the invoices written upon the paper band 52 are inscribed, the drum 92 is similar, is retained by a pawl operated similarly to pawl 47, and the drum is mounted similarly to drum 38 the mechanisms being similar to the parts shown in Figs. 14 to 17 but the drum 92 contains a single band 93 only of paper ruled with cash columns 94 as shown in Fig. 1. From the drum the paper passes over a roller 95 and thence below a narrow slot 96 provided in the top of the casing. A support 97 is provided immediately below the paper and opposite the slot 96 so that the paper may be written upon. The band 93 passes below a sheet of glass 98 through which writing upon the band is visible. Thence it passes around rollers 99 and 100 and is attached to a roller 101 similar and mounted similarly to the roller 74 in a carriage 102 similar to carriage 9. A rack 103, disk 104, spring operated pawl 105, toothed wheel 106, ratchet wheel 107 sleeve 108 and four armed spring 109 are similar to the corresponding parts employed with the drum 74 and operate in a similar manner. The carriage 102, however, is allowed a short travel only and is arrested as shown in Fig. 4 by its stop 110 after traveling sufficiently far to draw the paper band 93 a distance equal to one row of figures only. The carriage 102 is pushed forward after the opening of the drawer 2 by a spring 111 secured by a screw 112 to the back of the casing.

The frames 44 and 45 and the corresponding frames 113 and 114 which carry the drum 92 are attached to the top of the casing 1 by means of spring clips 115 shown in Figs. 3—4 and 13 fixed to the top of the casing and adapted to spring sidewise when the frames strike the sloping faces 116 of the spring clips.

What I do claim and desire to secure by Letters Patent of the United States is:—

1. Apparatus for the purpose indicated comprising in combination a casing, a carriage and drawer slidable in the lower part of the casing, frames supported in the casing, means for attaching the frames to the top of the casing, a drum having upper and lower bands of paper coiled thereon, pivot pins pivoting the drum, in the frames, a ratchet wheel fixed to a pivot pin of the drum, a pawl normally engaging the ratchet wheel, means for operating the pawl when the drawer is opened, guide rollers around which the paper bands travel, a support for the bands beneath an aperture provided in the top of the casing, a strip of carbon prepared material interposed between the bands of paper, a hood having a knife edge immediately above a slot provided in the top of the casing and through which the upper band passes, a sheet of glass in the top of the casing, spring means for forcing the carriage and drawer towards the front of the casing, a stop for arresting the travel of the carriage, means for locking the drawer in its closed position, a roller pivoted in the carriage the end of the lower paper band being secured to the said roller, and means whereby the roller is revolved during the inward travel only of the carriage substantially as described.

2. Apparatus for the purpose indicated, comprising in combination a casing, a carriage and drawer slidable in the lower part of the casing, frames supported in the casing, means for attaching the frames to the top of the casing, a drum having upper and lower bands of paper coiled thereon, pivot pins pivoting the drum, in the frames, a ratchet wheel fixed to a pivot pin of the drum, a pawl normally engaging the ratchet wheel, means for operating the pawl when the drawer is opened, guide rollers around which the paper bands travel, a support for the bands beneath an aperture provided in the top of the casing, a strip of carbon prepared material interposed between the bands of paper, a hood having a knife edge immediately above a slot provided in the top of the casing and through which the upper band passes, a sheet of glass in the top of the casing, spring means for forcing the carriage and drawer towards the front of the casing, a stop for arresting the travel of the carriage, means for locking the drawer in its closed position, a roller pivoted in the carriage, the end of the lower paper band being secured to the said roller, a toothed wheel secured to a pivot pin of the roller, a rack fixed to the side of the casing and with which the toothed wheel meshes, a disk secured to the toothed wheel, a spring operated pawl pivoted to the disk, a sleeve upon the pivot pin, a ratchet wheel integral with the sleeve, a friction spring secured to the sleeve and in compression between the roller and the cheek of the carriage, substantially as described.

3. Apparatus for the purpose indicated comprising in combination a casing, a carriage and drawer slidable in the lower part of the casing, frames pivoted in the casing means for attaching the frame to the top of the casing, a drum having upper and lower bands of paper coiled thereon, pivot pins pivoting the drum, in the frames, a ratchet wheel fixed to a pivot pin of the drum, a pawl normally engaging the ratchet wheel, means for operating the pawl when the drawer is opened, guide rollers around which the paper bands travel, a support for the bands beneath an aperture provided in the top of the casing, a strip of carbon material interposed between the bands of paper, a hood having a knife edge immediately above a slot provided in the top of the casing and through which the upper band passes, a sheet of glass in the top of the casing, and means for forcing the carriage and drawer towards the front of the casing comprising a spiral spring secured at one end to the back of the casing a cord secured to the other end of the spring, a grooved pulley pivoted near the front of the casing and around which the cord passes, a stud secured to the cheeks of the carriage and to which the cord is attached, substantially as described.

4. In apparatus for the purpose indicated in combination with a casing and a drum pivoted in the casing and having upper and lower bands of paper coiled thereon, and a drawer in the lower part of the casing, and a drum pivoted in the lower part of the casing and to which the lower band of paper is attached, of means for locking the drawer in its closed position, comprising a plurality of keys passing through slots in the front of the casing and pivoted to the said front, shouldered bolts having necks of narrow section and stems provided with slots through which the inner ends of the keys pass, upper and lower brackets secured to the inside of the casing and supporting the said bolt, a spiral spring located upon the said stem and in compression between the shoulder of the bolt and the upper bracket, a plate attached to the front of the drawer and provided with holes and slots through its front edge into the said holes, bosses upon the top of the plate and surrounding some of the holes, and bosses on the bottom of the plate surrounding some other of the holes, substantially as described.

5. In apparatus for the purpose indicated in combination with a casing, and a drum pivoted in the casing and having upper and lower bands of paper coiled thereon and a drum pivoted in the lower part of the casing and to which the lower band of paper is attached of a strip of carbon material passed between upper and lower bands of paper, rollers to which the carbon material is fastened, brackets secured to the frame of the apparatus and in which the rollers are journaled, milled heads for operating the rollers, springs located upon the rollers and in compression between the milled head thereof and the adjacent brackets and a plate secured to the top of the apparatus and passed below the paper bands for supporting said bands while being written upon substantially as described.

6. In apparatus for the purpose indicated, in combination with a casing and a drum pivoted in the casing and having upper and lower bands of paper coiled thereon, of a sliding carriage in the lower part of the casing and to which the lower band of paper is attached, a bracket fixed to the front and inside of the drawer and having recesses in its ends, spring catches attached to the ends of the bracket, a plate adapted to fit the bracket, recessed lugs upon the plate adapted to enter the recesses in the bracket and to be engaged by the spring catches, substantially as set forth.

7. In apparatus for the purpose indicated in combination, a casing frames supported in the casing, a carriage and drawer slidable in the lower part of the casing, a drum having upper and lower bands of paper coiled thereon, pivot pins pivoting the drum to the frames, guide rollers around which the paper passes, a support for the band beneath an aperture provided in the top of the casing, a roller pivoted in the carriage and to which the end of the paper is attached a stop for arresting the travel of the carriage, a sheet of glass in the top of the casing, a spring secured to the back of the casing and in compression therebetween and the carriage, and means whereby the roller is revolved during the inward travel only of the carriage substantially as described.

8. In apparatus for the purpose indicated, in combination a casing, frames supported within the casing a carriage and drawer slidable in the lower part of the casing a drum having upper and lower bands of paper coiled thereon, pivot pins pivoting the drum to the frames, guide rollers around which the paper passes, a support for the band beneath an aperture provided in the top of the casing, a roller pivoted in the carriage and to which the end of the paper is attached, a stop for arresting the travel of the carriage, a sheet of glass in the top of the casing, a spring secured to the back of the casing in compression there between and the carriage, a toothed wheel secured to one pivot pin of the roller, a rack fixed to the side of the casing and with which the toothed wheel meshes, a disk secured to the toothed wheel, a spring operated pawl pivoted to the disk, a sleeve upon the pivot pin, a ratchet wheel integral with the sleeve, a friction spring secured to the sleeve and in compression between the roller and the cheek of the carriage, substantially as described.

9. Apparatus for the purpose indicated comprising in combination a casing, a carriage and drawer slidable in the lower part of the casing, a drum having upper and lower bands of paper coiled thereon, pivot pins pivoting the drum in the casing, a ratchet wheel fixed to the pivot pin of the drum, a pawl normally engaging the ratchet wheel, means for operating the pawl when the drawer is opened, a support for the bands beneath an aperture provided in the top of the casing, a strip of carbon prepared material interposed between the bands of paper, a hood having a knife edge immediately above a slot provided in the top of the casing and through which the upper band passes, a sheet of glass in the top of the casing, spring means for forcing the carriage and drawer towards the front of the casing, means for locking the drawer in its closed position, a roller pivoted in the carriage the end of the lower paper band being secured to the said roller and means whereby the roller is revolved during the inward travel only of the carriage, a drum pivoted in the lower part of the casing and to which the lower band of paper is attached, a ratchet wheel fixed to a pivot pin of the drum a pawl normally engaging the ratchet wheel means for operating the pawl when the drawer is opened, a support for the band beneath an aperture provided in the top of the casing a second roller a carriage in which the said roller is pivoted and to which the end of the paper is attached, a sheet of glass in the top of the casing, a spring secured to the back of the casing, and in compression there between and the carriage, and means whereby the roller is revolved during the inward travel only of the carriage, substantially as described.

10. In apparatus for the purpose indicated in combination, a casing, frames supported in the casing, a carriage and drawer slidable in the lower part of the casing a drum pivoted to the frames, a ratchet wheel secured to a pivot of the drum, a pawl having a foot and pivoted to one of the frames and normally engaging the teeth of the ratchet wheel, a bar secured to the carriage, a distance piece between the bar and the carriage whereby the foot of the pawl may pass beneath the bar, and a pawl pivoted to the end of the bar, substantially as set forth.

In testimony whereof I have signed my name to this specification in the presence of two witnesses.

FREDERIC HENRY TREVELLIAN.

Witnesses:
J. J. WATSON,
A. J. PRIOR.